United States Patent
Kim

(10) Patent No.: US 10,953,811 B2
(45) Date of Patent: Mar. 23, 2021

(54) VEHICLE IMAGE CONTROLLER, SYSTEM INCLUDING THE SAME, AND METHOD THEREOF

(71) Applicants: HYUNDAI MOTOR COMPANY, Seoul (KR); KIA MOTORS CORPORATION, Seoul (KR)

(72) Inventor: Min Han Kim, Gunpo-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 0 days.

(21) Appl. No.: 16/743,894

(22) Filed: Jan. 15, 2020

(65) Prior Publication Data

US 2021/0024008 A1   Jan. 28, 2021

(30) Foreign Application Priority Data

Jul. 22, 2019   (KR) .......................... 10-2019-0088488

(51) Int. Cl.
*B60R 11/02*   (2006.01)
*G02B 27/00*   (2006.01)

(52) U.S. Cl.
CPC ...... *B60R 11/0235* (2013.01); *G02B 27/0093* (2013.01); *B60R 2300/202* (2013.01); *B60R 2300/605* (2013.01); *B60R 2300/8026* (2013.01)

(58) Field of Classification Search
USPC ........................................................ 348/148
See application file for complete search history.

(56) References Cited

U.S. PATENT DOCUMENTS

| | | | |
|---|---|---|---|
| 2004/0178894 A1* | 9/2004 | Janssen | B60R 1/00 340/435 |
| 2015/0022664 A1* | 1/2015 | Pflug | G06F 3/017 348/148 |
| 2016/0195927 A1* | 7/2016 | Lopez | H04N 5/2256 348/78 |
| 2018/0066941 A1* | 3/2018 | Kubota | G01C 9/04 |
| 2018/0307914 A1* | 10/2018 | Moon | G06K 9/00791 |
| 2020/0143560 A1* | 5/2020 | Lu | G06T 7/557 |

FOREIGN PATENT DOCUMENTS

| KR | 10-2013-0054032 A | 5/2013 |
|---|---|---|
| KR | 10-2013-0054636 A | 5/2013 |

* cited by examiner

*Primary Examiner* — Behrooz M Senfi
(74) *Attorney, Agent, or Firm* — Brinks Gilson & Lione

(57) ABSTRACT

A vehicle image controller, a system including the same, and a method thereof are provided. The vehicle image controller includes a processor configured to determine a head motion of a user or a sight motion of the user and to align a view point displayed on a display of a vehicle corresponding to the head motion or the sight motion and a storage configured to store information regarding the head motion or the sight motion.

19 Claims, 21 Drawing Sheets

<201> <202>

<501>

<502>

<503>

VEHICLE IMAGE CONTROLLER, SYSTEM INCLUDING THE SAME, AND METHOD THEREOF

CROSS-REFERENCE TO RELATED APPLICATION

The present application claims priority to and the benefit of Korean Patent Application No. 10-2019-0088488, filed on Jul. 22, 2019, which is incorporated herein by reference in its entirety.

TECHNICAL FIELD

The present disclosure relates to a vehicle image controller, a system including the same, and a method thereof, and more particularly, relates to increasing an angle of view of a camera according to motion of a user and shifting and displaying a view point.

BACKGROUND

The statements in this section merely provide background information related to the present disclosure and may not constitute prior art.

Recently, advanced driver assistance systems (ADAS) have been loaded into each of vehicles to enhance the safety of driving. There is a blind-spot viewing monitoring (BVM), a rear view monitoring (RVM), or the like as one of such ADAS. Vehicle imaging devices such as the BVM and the RVM have technologies of recognizing obstacles behind the vehicle and at a side of the vehicle when the vehicle is traveling or parking using cameras and providing information about the recognized obstacles to a user to assist the user to park and drive the vehicle.

SUMMARY

Such a conventional vehicle imaging device shows only a limited area which is previously set, a degree of freedom is more insufficient than a conventional manner in which the user turns his or her head and checks a wider area. Thus, the conventional vehicle imaging device corresponds to it by increasing an angle of view of a camera, but a distortion of the image may be increased and the user may feel stuffy depending on design graphics of a cluster. Furthermore, because distortion is too increased for indefinitely increasing an angle of view, there is an uppermost limit. Thus, setting locations of cameras is troubled in the development of vehicles.

An aspect of the present disclosure provides a vehicle image controller for increasing an angle of view (a view area) of a camera depending on heard or gaze motion of a user and shifting and displaying a view point, a system including the same, and a method thereof.

Another aspect of the present disclosure provides a vehicle image controller for correcting distortion which occurs when increasing an angle of view of a camera with respect to an area displayed on a display and providing an image, the distortion of which is corrected, a system including the same, and a method thereof.

The technical problems to be solved by the present inventive concept are not limited to the aforementioned problems, and any other technical problems not mentioned herein will be clearly understood from the following description by those skilled in the art to which the present disclosure pertains.

In one aspect of the present disclosure, a vehicle image controller may include: a processor that determines head or gaze motion of a user and controls a view point displayed on a display of a vehicle to move according to the head or gaze motion of the user and a storage storing information about the head or gaze motion of the user, the information being obtained by the processor.

In some forms of the present disclosure, the processor may extract one or more of a gaze, a head location, and/or an eye location of the user based on face image data of the user.

In some forms of the present disclosure, the processor may extract and filter at least a portion of vehicle outside image data in a direction the user looks at, based on the one or more of the gaze, the head location, and/or the eye location of the user.

In some forms of the present disclosure, the processor may correct an error of the filtered vehicle outside image data based on an acceleration sensing value of the vehicle.

In some forms of the present disclosure, the processor may correct the error by removing noise due to a behavior of the vehicle and introduction of an impact of the vehicle in the head or gaze motion of the user using acceleration of each axis from the acceleration sensing value of the vehicle.

In some forms of the present disclosure, the processor may set a reference location on image data displayed on the display, based on the one or more of the gaze, the head location, and/or the eye location of the user, and may shift and display the view point on the basis of the reference location.

In some forms of the present disclosure, the vehicle outside image data may be wide-angle image data. The processor may correct a distortion of the wide-angle image data.

In some forms of the present disclosure, the processor may correct the distortion by applying a correction filter to an area to be displayed on the display in the wide-angle image data.

In some forms of the present disclosure, the processor may invert an area to be displayed on the display in the wide-angle image data based on the head or gaze motion of the user, may shift a view point of the area to be displayed on the display, and may expand and display a view area.

In some forms of the present disclosure, the processor may set both eyes and a center point of both the eyes from face image data captured when the user sits in the driver's seat.

In some forms of the present disclosure, the processor may set reference axes of X-axis and Y-axis on the face image data and may determine an amount of view point movement of the user based on an amount of offset between the reference axes and the center point.

In some forms of the present disclosure, the processor may determine the amount of view point movement of the user based on the amount of offset between the reference axes and the center point or a distance between both the eyes, when the user turns his or her head about Z-axis.

In another aspect of the present disclosure, a vehicle system may include: a display that displays an image outside a vehicle and a vehicle image controller that determines head or gaze motion of a user and controls a view point displayed on the display to move according to the head or gaze motion of the user.

In some forms of the present disclosure, the vehicle system may further include a user tracking camera that captures a face or eyes of the user and one or more outside image capture cameras that capture each of the front, the rear, both sides of the vehicle and provide a wide-angle image.

In some forms of the present disclosure, the one or more outside image capture cameras may include one or more of a blind-spot monitoring (BVM), a rear view monitoring (RVM), and/or a rear view camera.

In some forms of the present disclosure, the user tracking camera may be mounted one or more of a lower end of a cluster, a crash pad, a steering wheel shroud, an audio, video, navigation (AVN), headlining, and/or an overhead console of the vehicle.

In some forms of the present disclosure, the vehicle system may further include an acceleration sensor that senses X-, Y-, or Z-axis acceleration of the vehicle.

In another aspect of the present disclosure, a vehicle image control method may include: determining head or gaze motion of a user and controlling a view point displayed on a display of a vehicle to be moved and displayed according to the head or gaze motion of the user.

In some forms of the present disclosure, the determining of the head or gaze motion of the user may include extracting one or more of a gaze, a head location, and/or an eye location of the user from face image data of the user and setting reference axes of X-axis and Y-axis on the face image data and determining an amount of view point movement of the user based on an amount of offset between the reference axes and a center point of both eyes.

In some forms of the present disclosure, the controlling of the view point to be moved and displayed may include extracting and filtering at least a portion of vehicle outside image data in a direction the user looks at, based on one or more of a gaze, a head location, and/or an eye location of the user, correcting an error of the filtered vehicle outside image data based on an acceleration sensing value of a vehicle, correcting the error by removing noise due to a behavior of the vehicle and introduction of an impact of the vehicle in the head or gaze motion of the user using acceleration of each axis from the acceleration sensing value of the vehicle and, and setting a reference location on image data displayed on the display, based on the one or more of the gaze, the head location, and/or the eye location of the user and shifting and displaying the view point on the basis of the reference location.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
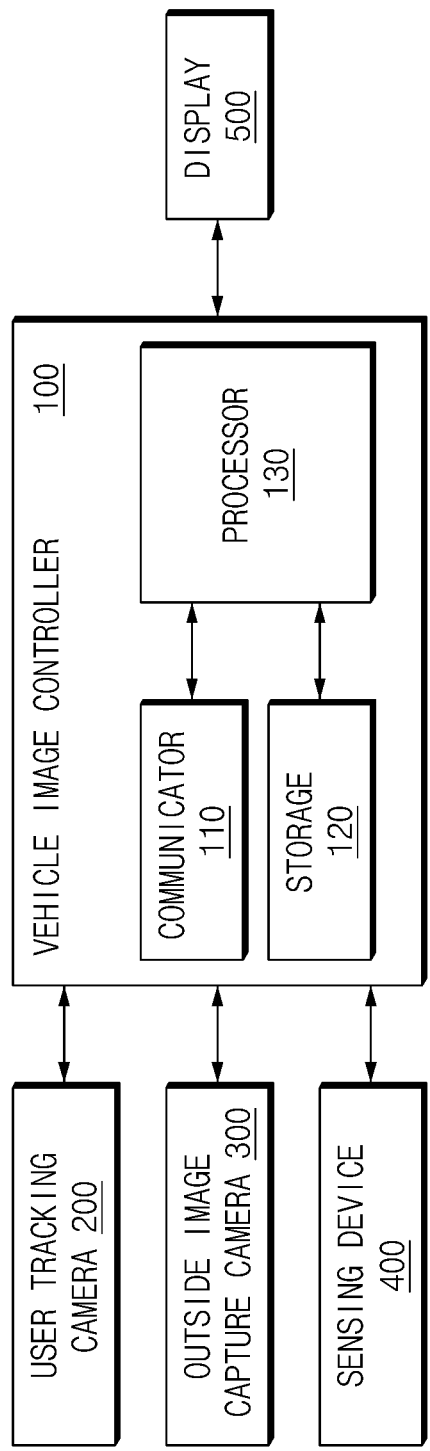
FIG. 1 is a block diagram illustrating a configuration of a vehicle system including a vehicle image controller in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing some forms of the present disclosure, a detailed description of well-known features or functions will be ruled out in order not to unnecessarily obscure the gist of the present disclosure.

In describing some forms of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Some forms of the present disclosure disclose technologies of increasing a degree of freedom of a view of a user by shifting a view point depending on user's head turn and increasing and providing an angle of view of a camera.

Hereinafter, a description will be given in some forms of the present disclosure with reference to FIGS. 1 and 21. FIG. 1 is a block diagram illustrating a configuration of a vehicle system including a vehicle image controller in some forms of the present disclosure.

Referring to FIG. 1, the vehicle system in some forms of the present disclosure may include a vehicle image controller 100, a user tracking camera 200, an outside image capture camera 300, a sensing device 400, and a display 500.

The vehicle image controller 100 may determine head or gaze motion of a user and may control a view point displayed on the display 500 to move according to the head or gaze motion of the user.

The vehicle image controller 100 may include a communicator 110, a storage 120, and a processor 130.

The communicator 110 may be a hardware device implemented with various electronic circuits to transmit and receive a signal over a wireless or wired connection. In some forms of the present disclosure, the communicator 110 may perform inter-vehicle communication through controller area network (CAN) communication, local interconnect network (LIN) communication, Ethernet communication, or the like.

The storage 120 may store the sensing result of the sensing device 400, or the like obtained by the processor 130. The storage 120 may include at least one type of storage medium, such as a flash memory type memory, a hard disk type memory, a micro type memory, card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk.

The processor 130 may be electrically connected with the communicator 110, the storage 120, the display 500, and the like and may electrically control the respective components. The processor 130 may be an electrical circuit which executes instructions of software and may perform a variety of data processing and calculation described below.

The processor 130 may determine head or gaze motion of the user and may control a view point displayed on the display 500 to move according to the head or gaze motion of the user. The processor 130 may extract one or more of a gaze, a head location, and/or eye location of the user based on face image data of the user. The processor 130 may extract and filter at least a portion of vehicle outside image data in a direction the user looks at, based on one or more of the gaze, the head location, and/or the eye location of the user.

The processor 130 may correct an error of the filtered vehicle outside image data based on an acceleration sensing value of the vehicle and may remove noise due to a behavior of the vehicle and introduction of an impact of the vehicle during head or gaze motion of the user using acceleration of each axis from the acceleration sensing value of the vehicle to correct an error.

The processor 130 may set a reference location on image data displayed on the display 500 based on one or more of a gaze, a head location, and/or an eye location of the user and may shift and display a view point, on the basis or the reference location. The processor 130 may correct a distortion of vehicle outside image data which is wide-angle image data. Particularly, the processor 130 may correct distortion by applying a correction filter to an area to be displayed on the display 500 in the wide-angle image data, thus reducing a load according to the distortion correction. The processor 130 may invert the region to be displayed on the display 500 in the wide-angle image data based on head or gaze motion of the user, may shift a view point of the region to be displayed on the display 500, and may expand and display a view area.

The processor 130 may set both eyes and a center point of both the eyes from face image data captured when the user sits in the driver's seat, may set reference axes of X-axis and Y-axis the face image data, and may determine an amount of view point movement of the user based on an amount of offset between the reference axis and the center point. Furthermore, when the user turns his or her head about Z-axis, the processor 130 may determine an amount of view point movement of the user based on an amount of offset between the reference axis and the center point or a distance between both eyes.

The user tracking camera 200 may capture a face and pupils of the user. To this end, the user tracking camera 200 may be mounted in front of the user, but may be changed according to a recognition environment and may be mounted at a lower end of a cluster or on a crash pad, a steering wheel shroud, an audio, video, navigation. (AVN), a headlining, an overhead console, or the like.

The outside image capture camera 300 may be a wide-angle camera, may capture an image of a front, a rear, or both sides of the vehicle, and may be mounted on each of the front, rear, and both the sides of the vehicle. The outside image capture camera 300 may be implemented as a blind-spot view monitoring (BVM) or a rear view monitoring (RVM).

The sensing device 400 may include an acceleration sensor (a. G sensor) for sensing acceleration of the vehicle. The acceleration sensor may sense X-, Y-, and Z-axis acceleration of the vehicle. Furthermore, motion (e.g., head turn or eye turn) of the user is recognized using the camera. However, forms of the prevent disclosure are not limited thereto. For example, the motion of the user may be detected using an ultrasonic sensor or the like.

The display 500 may display image data corrected by the vehicle image controller 100. The display 500 may be implemented as a head-up display (HUD), a cluster, an audio video navigation (AVN), or the like. Furthermore, the display 500 may include at least one of a liquid crystal display (LCD), a thin film transistor-LCD (TFT-LCD), a light emitting diode (LED) display, an organic LED (OLED) display, an active matrix OLED (AMOLED) display, flexible bended display, a bended display, or a three-dimensional (3D)

display. Some thereof may be implemented as transparent displays configured as a transparent type or a semi-transparent type see the outside. Moreover, the display 500 may be implemented as a touchscreen including a touch panel to be used as an input device other than an output device.

Figure 2:
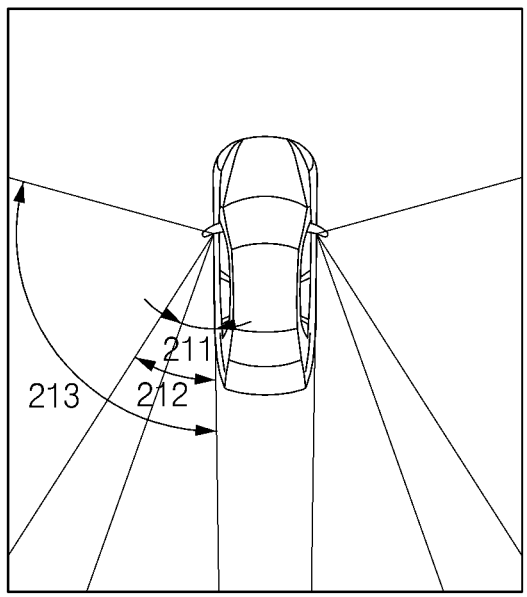
FIG. 2 is a drawing illustrating a view area of an outside image capture camera in one form of the present disclosure.
Figure 2:
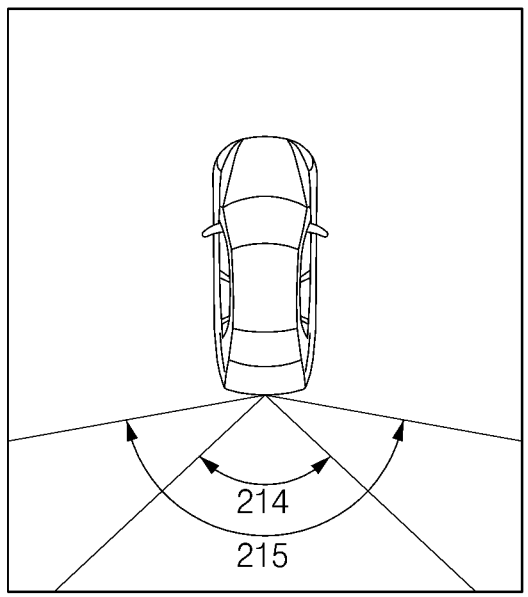

FIG. 2 is a drawing illustrating a view area of an outside image capture camera in some forms of the present disclosure.

Reference numeral 201 of FIG. 2 indicates a view area of a side mirror of a vehicle. A conventional side mirror displays a view area range like reference numeral 211. Reference numeral 212 refers to an expanded view area range when a camera mounted outside the vehicle is used. Reference numeral 213 refers to a view area range expanded by increasing an angle of view of a camera in some forms of the present disclosure.

Reference numeral 202 indicates a view area range through a rear view camera. Reference numeral 214 refers to a view area range through a camera. Reference numeral 215 refers to a view area range expanded by increasing an angle of view of the camera in some forms of the present disclosure.

Figure 3:
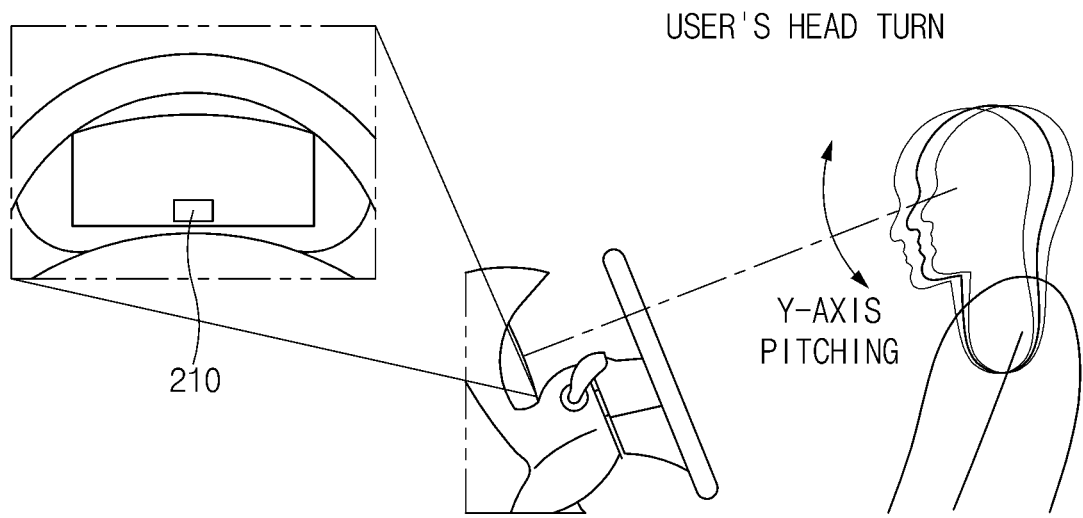
FIG. 3 is a drawing illustrating an example of mounting a user tracking camera in one form of the present disclosure.
Figure 4:
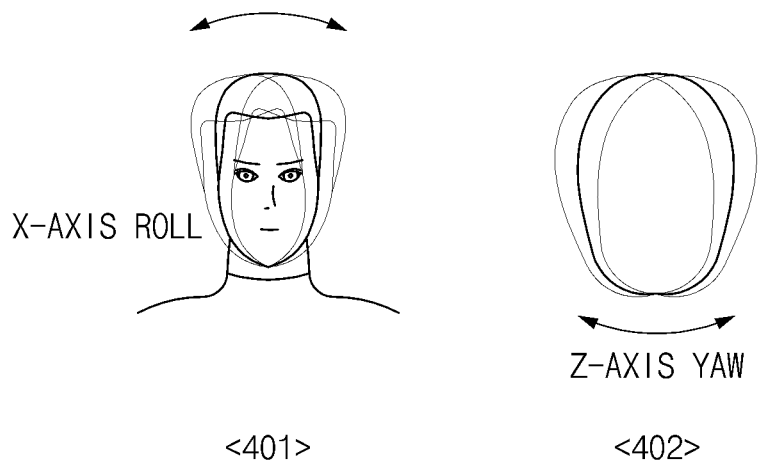
FIG. 4 is a drawing illustrating an exemplary operation process for recognizing user's head turn in one form of the present disclosure.

FIG. 3 is a drawing illustrating an example of mounting a user tracking camera in some forms of the present disclosure. FIG. 4 is a drawing illustrating an exemplary operation process for recognizing user's head turn in some forms of the present disclosure.

Referring to FIG. 3, a user tracking camera 210 is installed at a lower end of a cluster of a vehicle. Thus, the user tracking camera 210 may capture motion of a face of a user, that is, pitching about Y-axis and rolling about X-axis. Reference numeral 401 of FIG. 4 indicates rolling of the user about X-axis. Reference numeral 402 indicates yawing about Y-axis.

Figure 5:
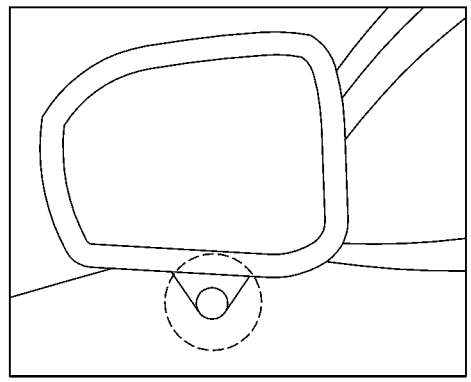
FIG. 5 is a drawing illustrating movement of a camera view according to user's head turn in one form of the present disclosure.
Figure 5:
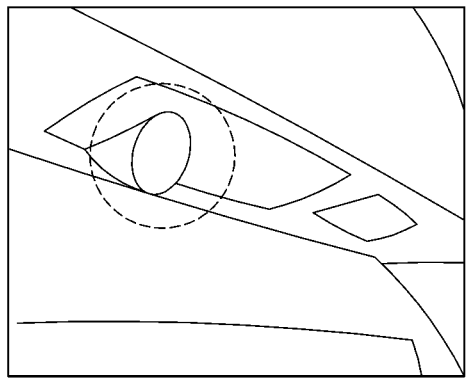
Figure 5:
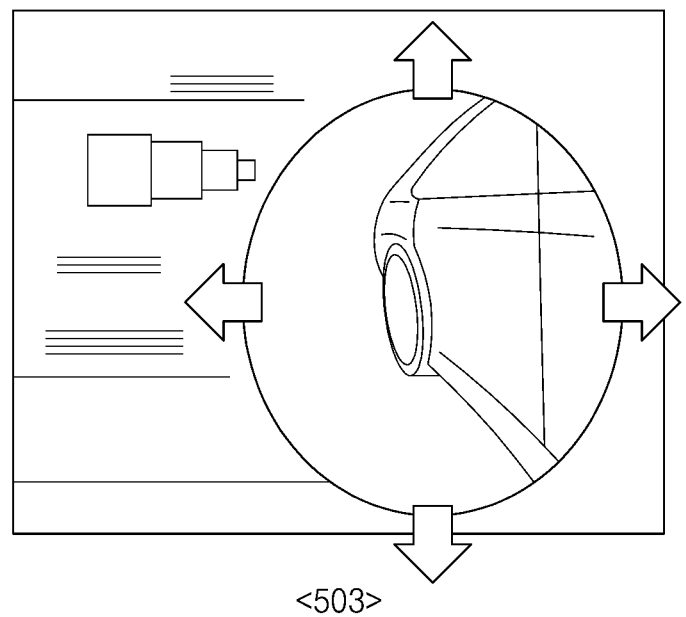

FIG. 5 is a drawing illustrating movement of a camera view according to user's head turn in some forms of the present disclosure.

Reference numeral 501 of FIG. 5 indicates an example in which an outside image capture camera 300 of FIG. 1 is mounted at a lower end of a side mirror of a vehicle. Reference numeral 502 indicates an example in which the outside image capture camera 300 is mounted on the rear of the vehicle. Reference numeral 503 indicates an example of displaying an image expanded in the direction of an arrow as a user turns his or her head.

As such, some forms of the present disclosure may recognize user's head turn using the user tracking camera 200 located on a cluster of the vehicle when the user turns his or her head and may shift a view point of an outside image capture camera 300 of FIG. 1 to expand a view of the user.

In this case, a vehicle image controller 100 of FIG. 1 may detect whether the user turns his or her head, using face recognition through an eye or face shape of the user from user face image data obtained using the user tracking camera 200 on the front of the cluster.

Furthermore, the vehicle image controller 100 may assign a degree of sight freedom to the user by shifting a view point depending on user's head turn from a reference location when a blind-spot view monitoring (BVM), a rear view monitoring (RVM), or a rear view camera is operated.

Furthermore, to improve that an image is distorted when an angle of view of a camera is increased, the vehicle image controller 100 may localize a view area to be displayed on a display 500 of FIG. 1 when the user turns his or her head to correct a distortion of the view area. Moreover, the vehicle image controller 100 may display a previously set-up view area or may allow the user to select enabling a function of moving a view area according to user's head turn.

Figure 6:
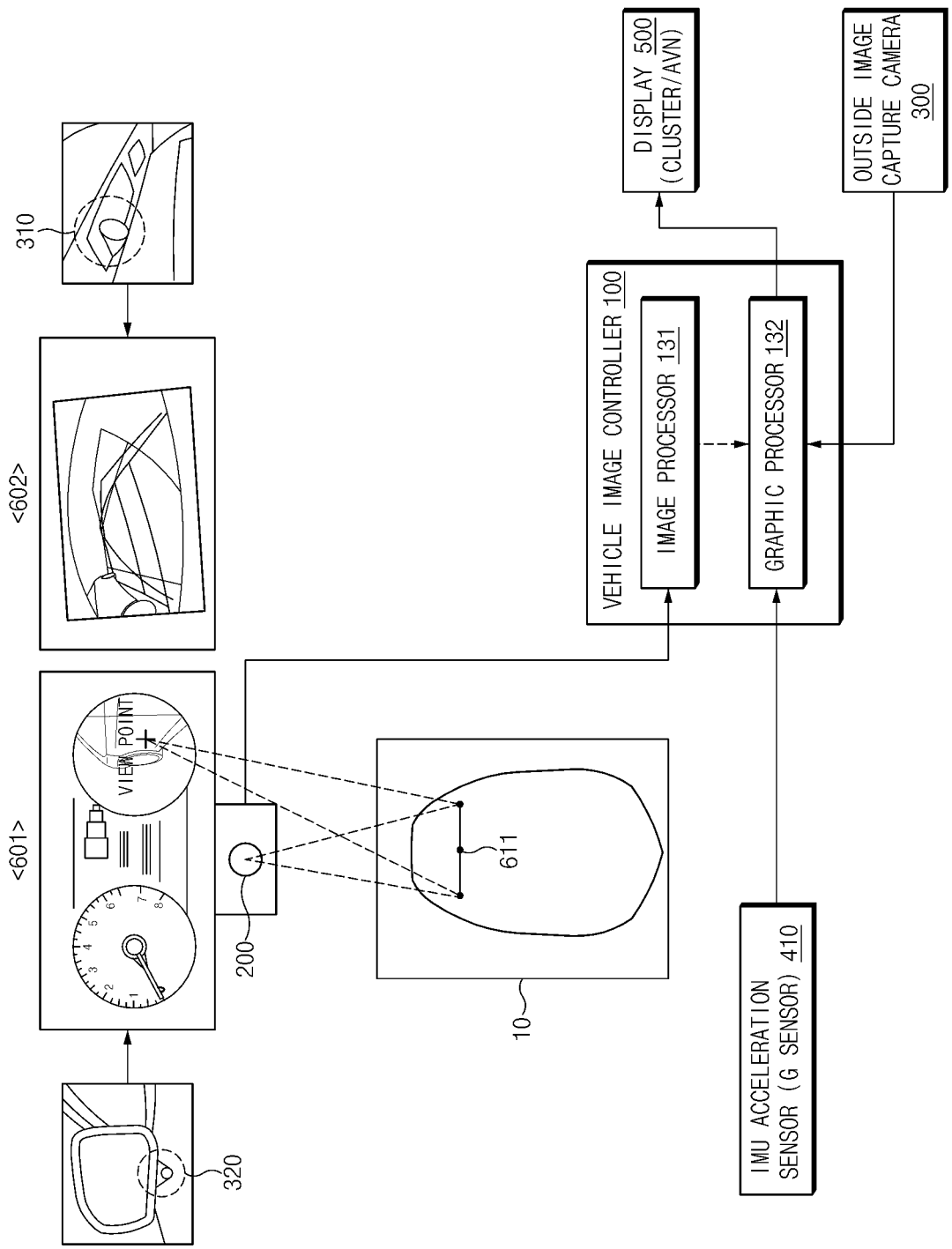
FIG. 6 is a conceptual diagram illustrating the entire vehicle image control process in one form of the present disclosure.

FIG. 6 is a conceptual diagram illustrating the entire vehicle image control process in some forms of the present disclosure.

Referring to FIG. 6, when a user face is captured by a user tracking camera 200, an image processor 131 of a vehicle image controller 100 may extract a gaze, a head location, and an eye location of a user 10 from face image data.

A graphic processor 132 of the vehicle image controller 100 may compare a vehicle acceleration value obtained by an IMU acceleration sensor 410 with motion of the user 10 to correct an error as a result of the comparison. In other words, to minimize that user's head turn according to a change in behavior of a vehicle rather than head turn by an intention of the user 10 is detected, the vehicle image controller 100 may compare an acceleration value of the vehicle with motion of the user 10 to correct an error as a result of the comparison.

The vehicle image controller 100 may set a view point of an image obtained by an outside image capture camera 300 using the gaze, the head location, and the eye location of the user 10, extracted by the image processor 131, and may correct a distortion of the set view point.

In other words, as shown in FIG. 6, the vehicle image controller 100 may set a point which is met by drawing extensions in the direction of a gaze of the user from locations of both eyes (see reference numeral 601). The display 500 may display an image captured by a side mirror camera 320 on the basis of the view point and may display a backward image captured by a rear view camera 310 on its screen (see reference numeral 602).

Figure 7:
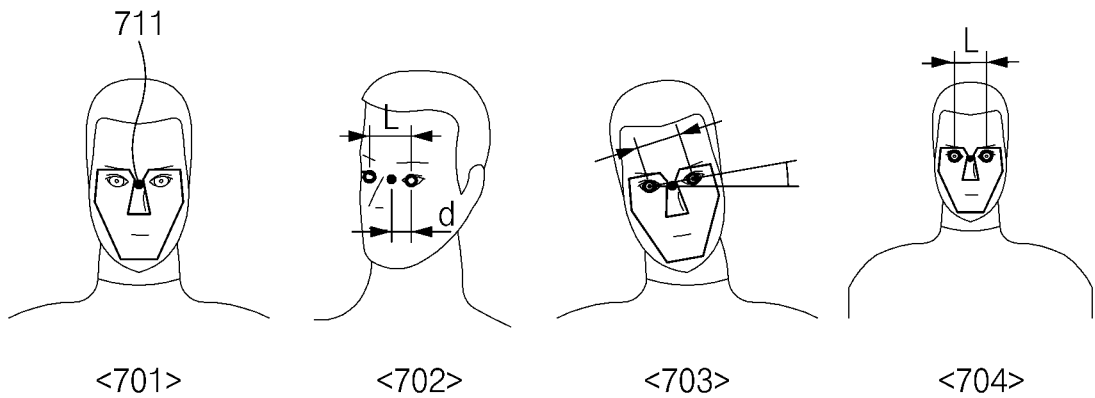
FIG. 7 is a drawing illustrating a user face recognition process in one form of the present disclosure.
Figure 8:
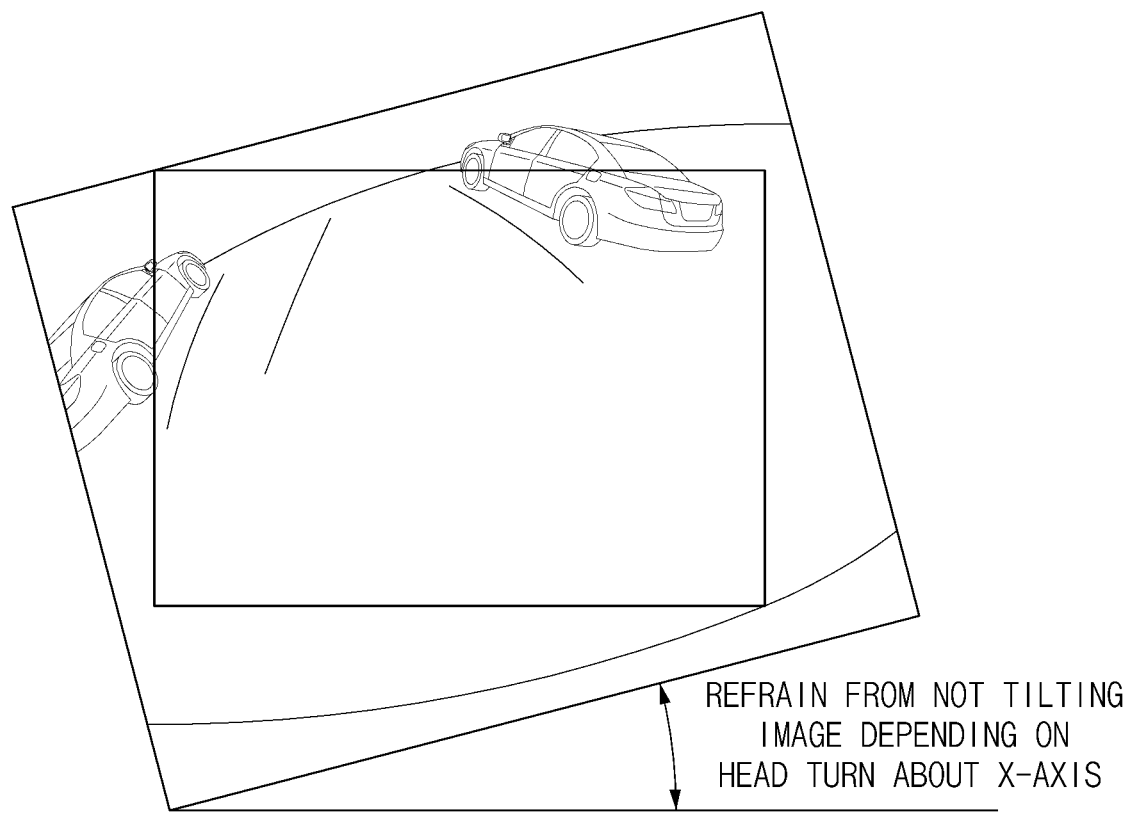
FIG. 8 is a drawing illustrating an example of refraining from not tilting an image depending on user's head turn in one form of the present disclosure.

FIG. 7 is a drawing illustrating a user face recognition process in some forms of the present disclosure. FIG. 8 is a drawing illustrating an example of refraining from not tilting an image depending on user's head turn in some forms of the present disclosure.

Referring to reference numeral 701 of FIG. 7, when failing to recognize pupils of a user because eyes of the user are small or because the user wears his or her glasses/sunglasses, a vehicle image controller 100 of FIG. 1 may recognize locations of eyes based on a shape around the eyes to correspond to such an environment.

The vehicle image controller 100 may allow the user to take a right posture and look at a camera during a predetermined time to set an initial reference value when a vehicle is started (or when the vehicle is operated) and may initiate a reference value at every start-up.

Furthermore, the vehicle image controller 100 may estimate the center of both eyes and may set and track any point. Both eyes and a center point 711 may be set newly every time when the user sits in the driver's seat.

Referring to reference numeral 702, the vehicle image controller 100 may set an x'-/y'-axis based on the initial reference value and may determine an amount of view point movement based on an amount of offset between the center point 711 of both the eyes and the reference axis. Particularly, for head turn (yawing) about Z-axis, which is the most important factor in some forms of the present disclosure, the vehicle image controller 100 may estimate the center of both the eyes using a length of distance L between both the eyes (or distance d between each eye and the center point 711) other than the amount of offset between the center point 711 of both the eyes and the reference axis.

Referring to reference numeral 703, the user may frequently drive his or her vehicle with his or her head titled. In this case, a center point of both the eyes may be offset on a certain portion from a central axis. Thus, as soon as the vehicle image controller 100 operates its function for safety reasons, it may display a default view and may recognize and output head motion in the same direction as a direction where the head is titled. Head motion in the direction opposite to the direction where the head is titled may operate after passing through the central axis. In this case, as shown in FIG. 8, tilting of an image may be limited about X-axis to prevent confusion.

Referring to reference numeral 704, the user may set sensitivity, but the vehicle image controller 100 may estimate a relative distance from a cluster using distance L between both the eyes and may additionally vary sensitivity.

Figure 9:
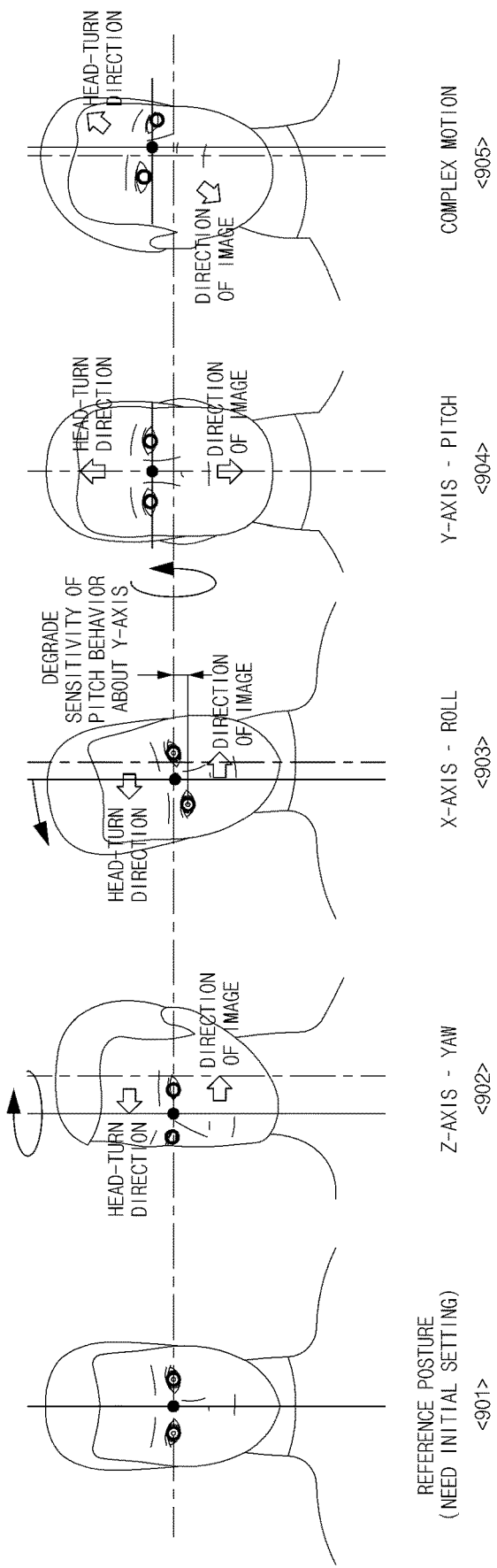
FIG. 9 is a drawing illustrating a process for recognizing a direction of user's head turn in one form of the present disclosure.

FIG. 9 is a drawing illustrating a process for recognizing a direction of user's head turn in some forms of the present disclosure.

Reference numeral 901 of FIG. 9 indicates an initially set reference posture. Reference numeral 902 indicates that there is head turn about Z-axis. Reference numeral 903 indicates that there is head turn about X-axis. Reference numeral 904 indicates that there is head turn about Y-axis. Reference numeral 905 indicates complex motion.

A vehicle image controller 100 of FIG. 1 may differently change sensitivity according to each axis to suppress unnecessary movement of the image. In other words, the vehicle image controller 100 may degrade sensitivity of a pitch behavior on Y-axis to restrain an unnecessary pitch behavior of the image when rolling/yawing occurs. Furthermore, for a rear view camera when a vehicle is traveling at a low speed, the vehicle image controller 100 may increase sensitivity of a pitch behavior on Y-axis (in consideration of a parking/narrow road situation).

Figure 10:
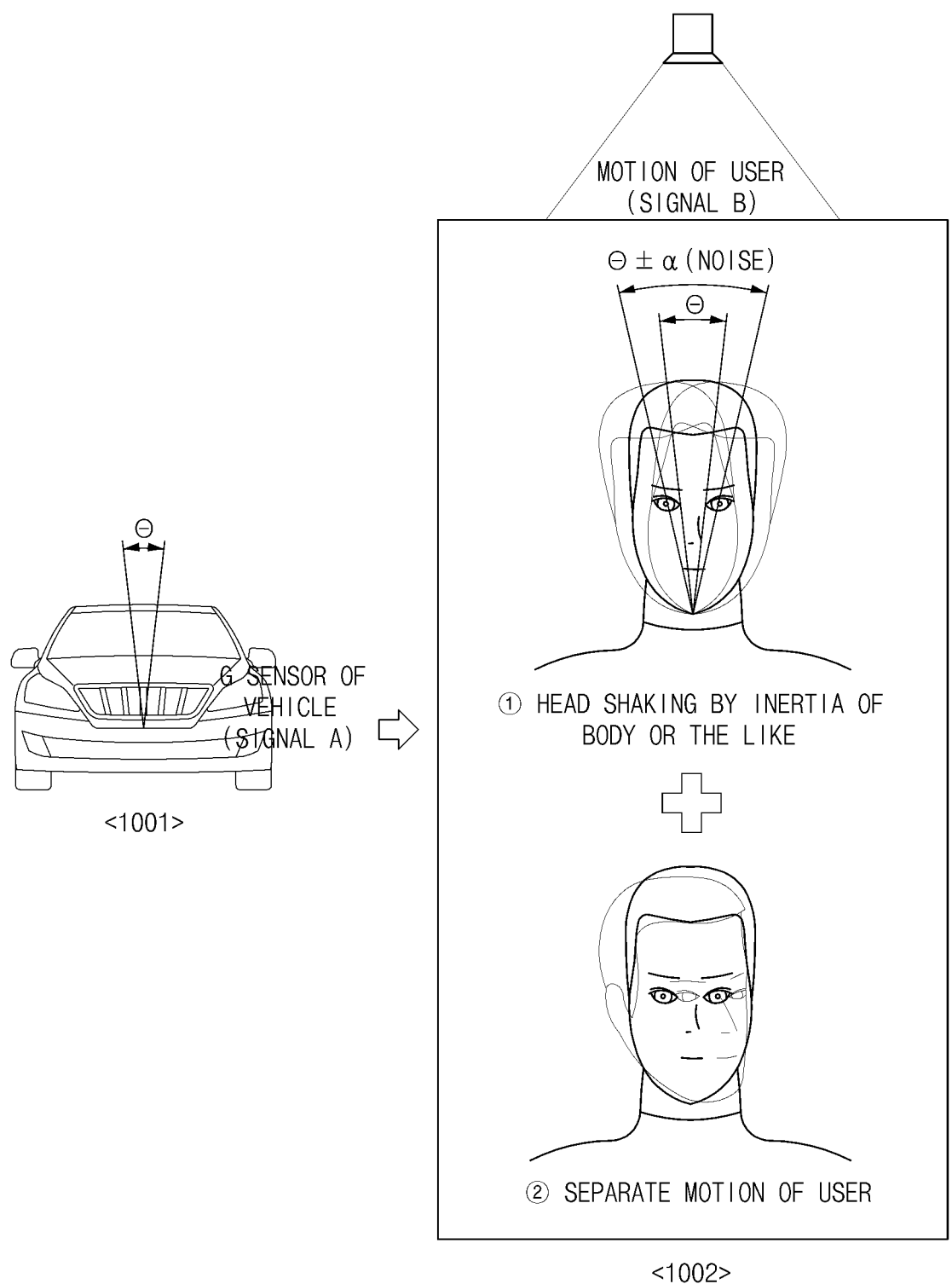
FIG. 10 is a drawing illustrating a process for preventing view movement from malfunctioning due to a behavior of a vehicle in one form of the present disclosure.

FIG. 10 is a drawing illustrating a process for preventing view movement from malfunctioning due to a behavior of a vehicle in some forms of the present disclosure.

Referring to FIG. 10, to prevent undesired manipulation of shifting a view area when a posture of a user is changed due to a behavior of a vehicle, introduction of an impact of the vehicle, and the like, a vehicle image controller 100 of FIG. 1 may delete a signal (noise) except for a certain area in consideration of acceleration of each axis, detected by an acceleration sensor of the vehicle, to prevent motion of the user from being incorrectly detected unsuitably for an intention of the user.

Reference numeral 1001 indicates an example in which the vehicle rolls according to a road surface, a driving environment, or the like. The vehicle image controller 100 may receive an acceleration value (signal A) from the acceleration sensor (the G sensor) of the vehicle.

Reference numeral 1002 indicates an example of detecting head shaking due to inertia of the body or the like and separate motion of the user (signal B).

Figure 11:
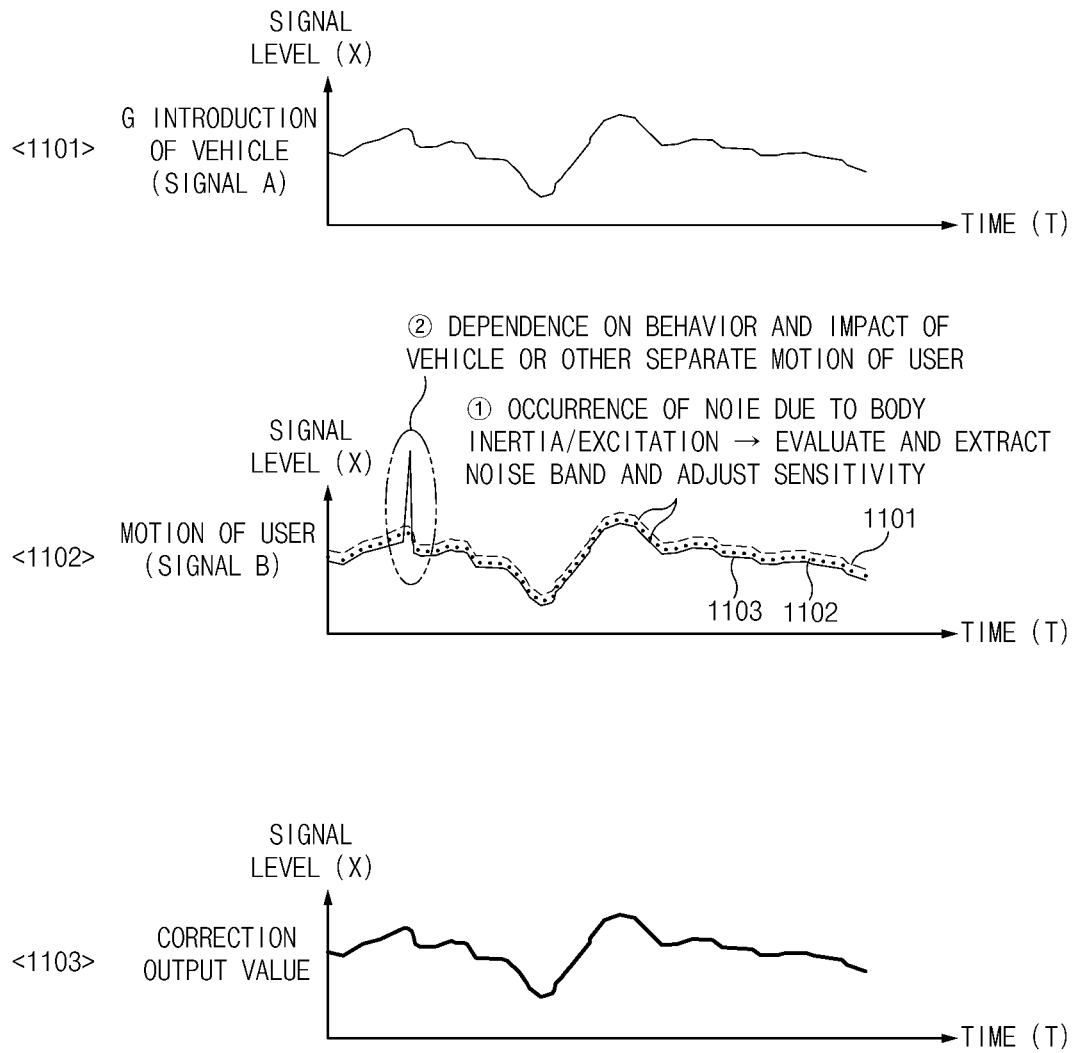
FIG. 11 is a graph illustrating the result of correcting user's head turn using vehicle acceleration in one form of the present disclosure.

FIG. 11 is a graph illustrating the result of correcting user's head turn using vehicle acceleration in some forms of the present disclosure.

Reference numeral 1101 of FIG. 11 indicates a graph of signal A received from an acceleration sensor of a vehicle. Reference numeral 1102 indicates a graph of signal B due to motion of a user. Reference numeral 1103 indicates a graph indicating a corrected output value.

In other words, signal A received from the acceleration sensor of the vehicle and signal B due to the motion of the user are moved according to similar curves. When motion (head turn) occurs by the user, noise occurs.

In other words, when noise depending on a behavior and impact of the vehicle or the other separate motion of the user or noise due to body inertia, excitation, or the like occurs, a noise band may be evaluated and extracted and sensitivity may be adjusted.

Figure 12:
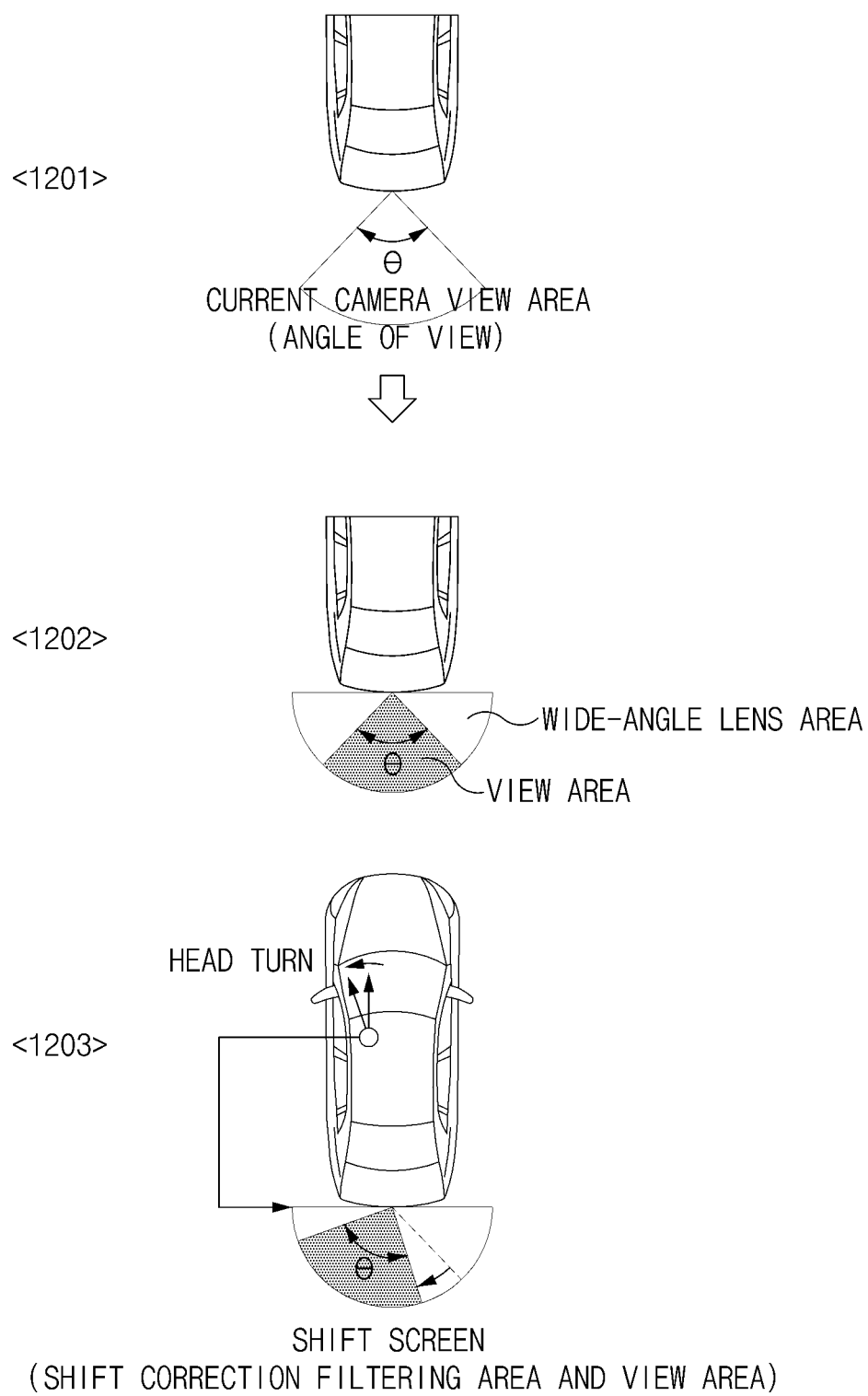
FIG. 12 is a drawing illustrating an example of expanding a view area (an angle of view) of a camera in one form of the present disclosure.

FIG. 12 is a drawing illustrating an example of expanding a view area (an angle of view) of a camera in some forms of the present disclosure. Reference numeral 1201 of FIG. 12 indicates an existing camera view area. Reference numeral 1202 indicates a view area and an expanded wide-angle lens area of a camera. Reference numeral 1203 indicates a view area shift range according to motion of a user.

Figure 13:
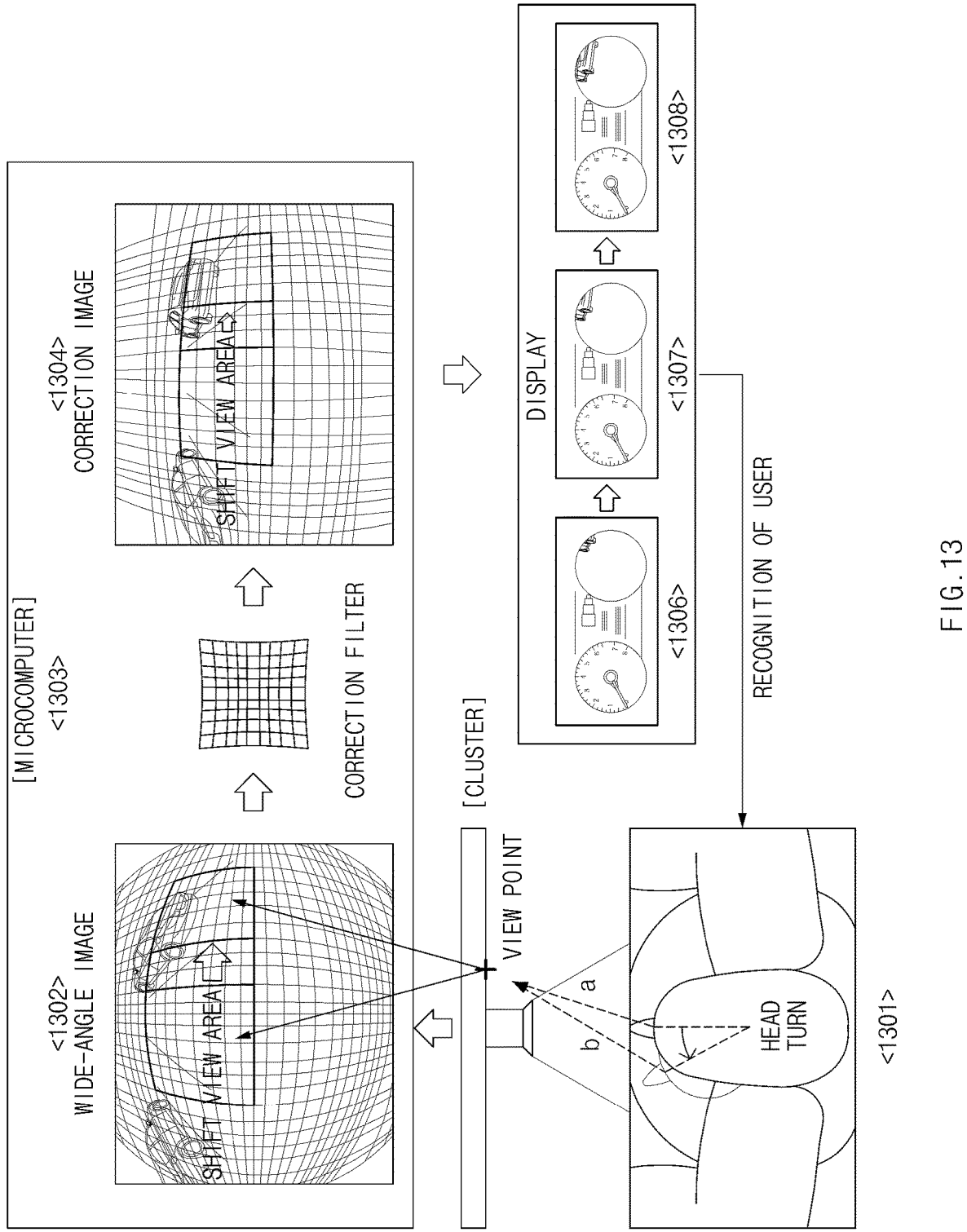
FIG. 13 is a drawing illustrating an example of displaying a distortion correction image based on user's head turn and vehicle acceleration in one form of the present disclosure.

FIG. 13 is a drawing illustrating an example of displaying a distortion correction image based on user's head turn and vehicle acceleration in some forms of the present disclosure.

A view area of a wide-angle image is shifted in reference numeral 1302 of FIG. 13 according to a shift of a view point of a user in reference numeral 1301 of FIG. 13. In this case, it may be seen that an image in reference numeral 1302 is distorted due to expansion. Thus, when correcting the wide-angle image in reference numeral 1302 using a correction filter in reference numeral 1303, a vehicle image controller 100 of FIG. 1 may correct distortion in reference numeral 1304.

The vehicle image controller 100 may display the corrected image in reference numeral 1304 on a display 500. In this case, changes of the screen when a view point is shifted according to motion of the user are shown in reference numerals 1306 to 1308.

A general wide-angel camera may determine an angle of view depending on a limit in distortion of the image. This is because the user generates a recognition error according to a size of the image and aggravation of distortion. A correction filter may be applied to a surround view monitor (SVM) to inversely distort the image, and a short-range image may be expressed as if seen from the air. Using such a principle, an angle of view of a camera showing a wider area may be provided, and only a limit range recognizable by the user in the angle of view of the camera may be displayed on the display 500. A wider field of view may be ensured by using the correction filter partially when a view area is shifted by head turn.

The example of FIG. 13 is for illustrative purposes for shifting a view area. An angle of view may be expanded to an area capable of performing correction filtering upon actual application, and the expanded angle of view may be partially moved and corrected. In other words, a reduced image compared with a current camera view area may fail to be shown, and a wide-angel lens such as a fisheye lens may be used.

Figure 14:
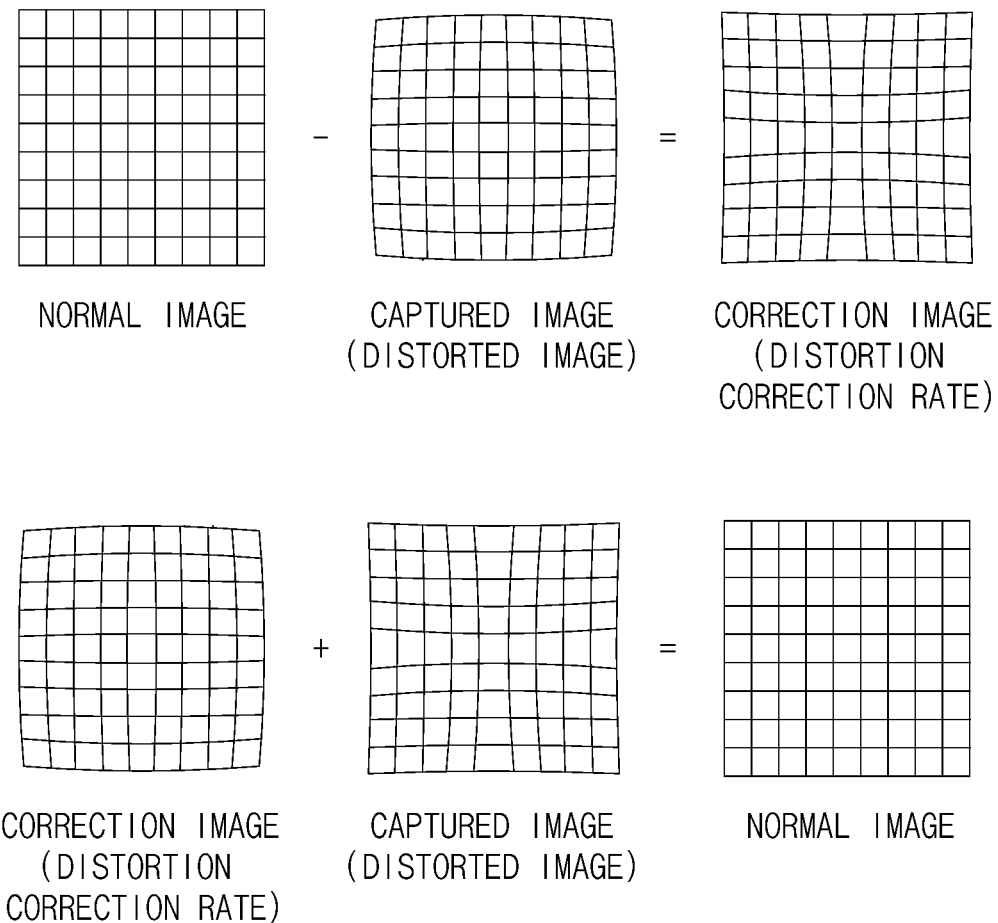
FIG. 14 is a drawing illustrating the concept of correcting distortion according to expansion of an angle of view of a camera in one form of the present disclosure.

FIG. 14 is a drawing illustrating the concept of correcting distortion according to expansion of an angle of view of a camera in some forms of the present disclosure. Referring to FIG. 14, a captured distortion image may be subtracted from a normal image to generate a correction image, and the correction image may be added to the captured distortion image to generate the normal image.

Figure 15:
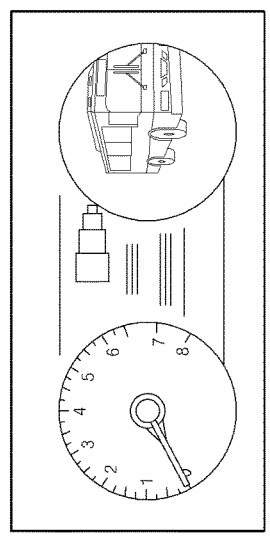
FIG. 15 is a drawing illustrating an example of displaying an image, a distortion of which is corrected, according to a shift of view in one form of the present disclosure.
Figure 15:
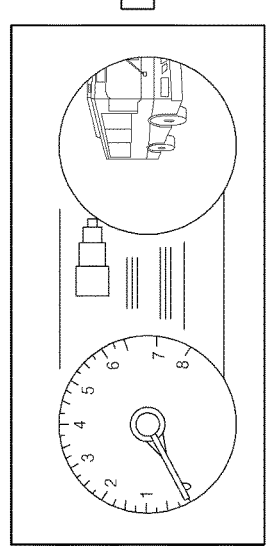
Figure 15:
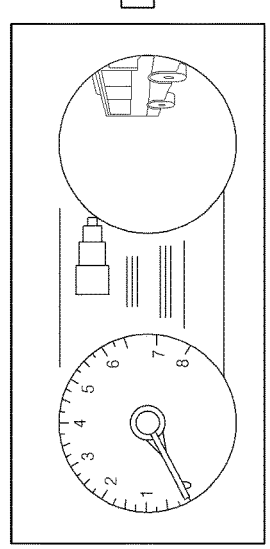

FIG. 15 is a drawing illustrating an example of displaying an image, a distortion of which is corrected, according to a shift of view in some forms of the present disclosure. Referring to reference numerals 1501, 1502, and 1503 of FIG. 15, an example in which a view area displayed on a display 500 of FIG. 1 is shifted according to gaze motion of a user is shown.

Figure 16:
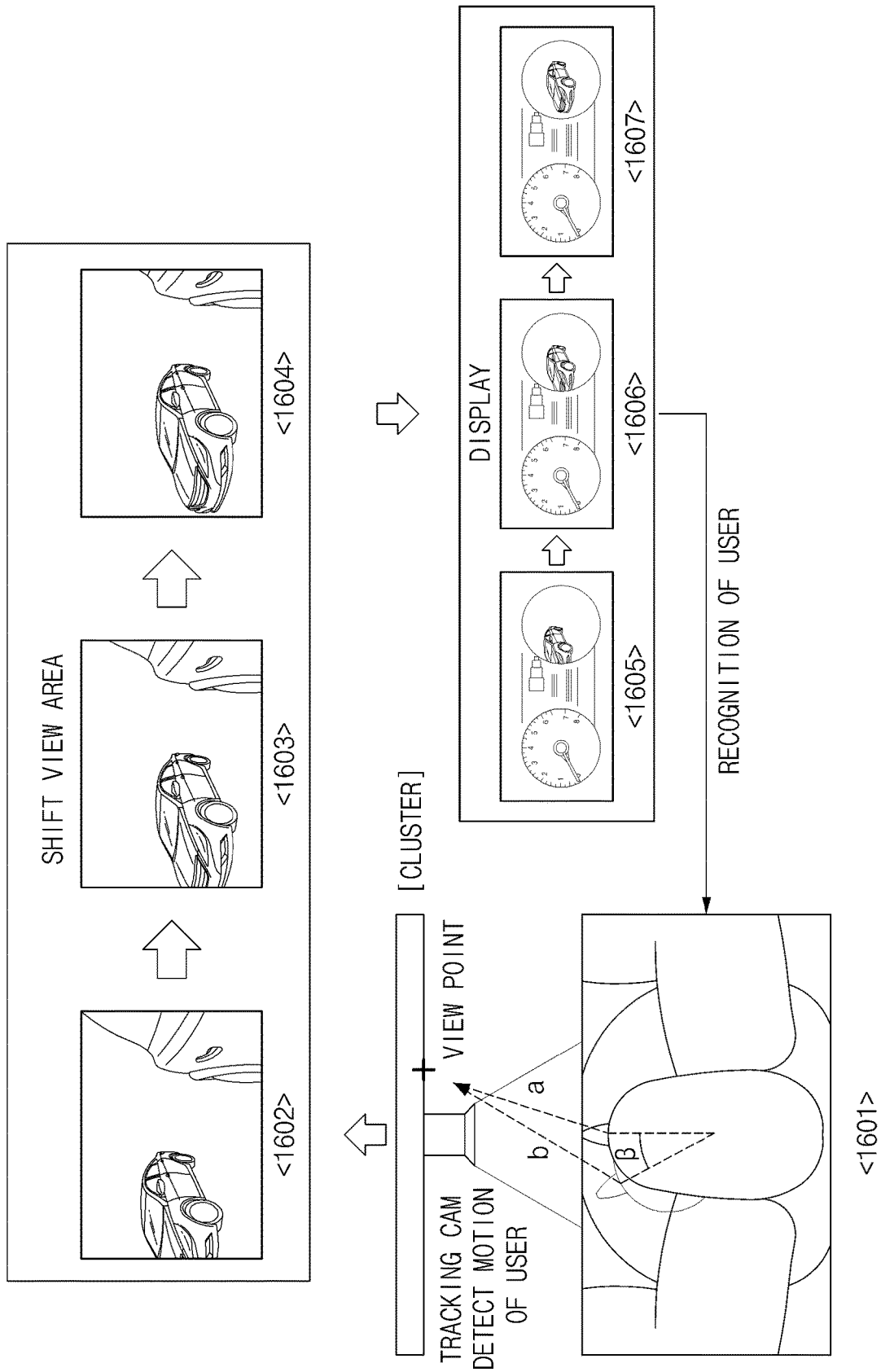
FIG. 16 is a drawing illustrating an example of displaying a screen using a view area depending on user's head turn in one form of the present disclosure.

FIG. 16 is a drawing illustrating an example of displaying a screen using a view area depending on user's head turn in some forms of the present disclosure.

Referring to reference numeral 1601 of FIG. 16, upon head-turn or eye-turn, a user tracking camera 200 of FIG. 1 may recognize a face, eyes, or the like of a user and may recognize an operation of the user.

As a gaze of the user moves in reference numerals 1602, 1603, and 1604 of FIG. 16, a view area displayed on the display 500 may be shifted in reference numerals 1605, 1606, and 1607 of FIG. 16.

Figure 17:
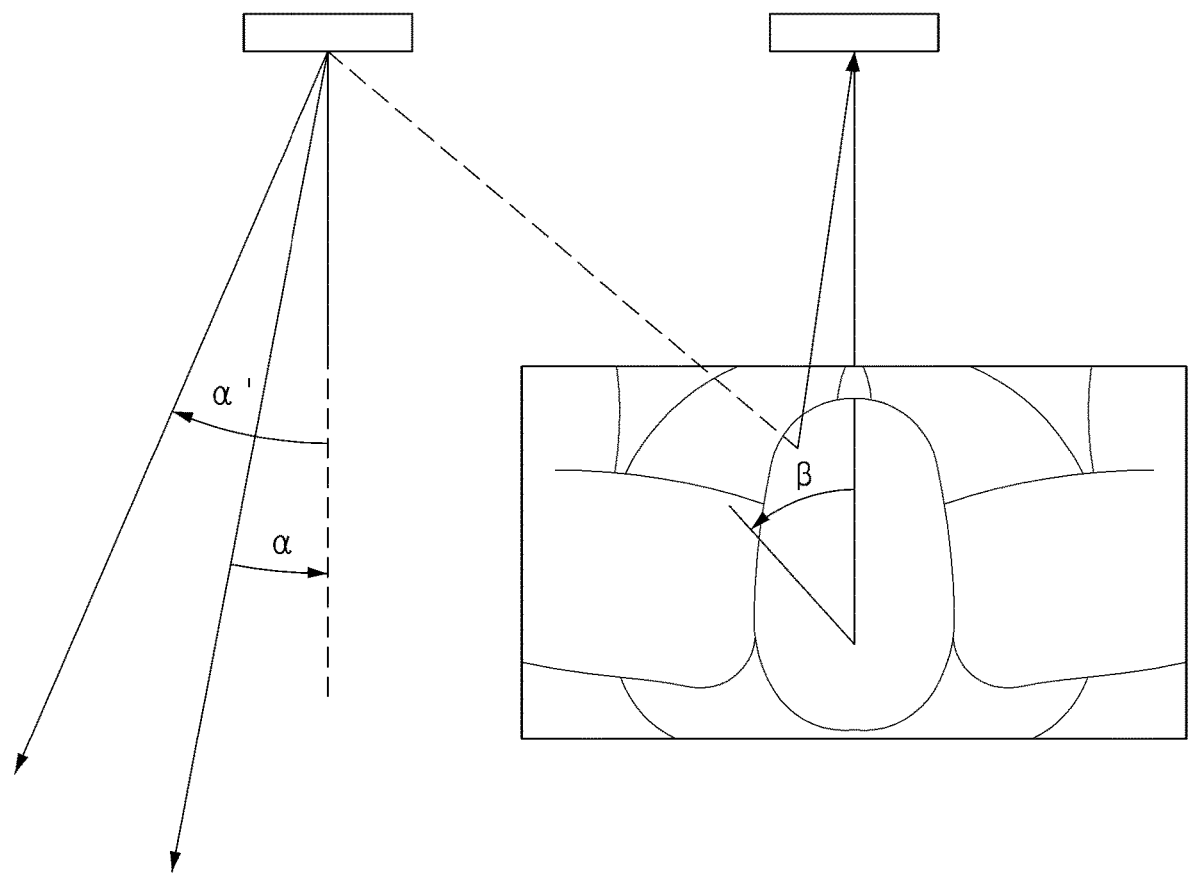
FIG. 17 is a drawing illustrating a degree of freedom according to a shift of a view area depending on user's head turn in one form of the present disclosure.

FIG. 17 is a drawing illustrating a degree of freedom according to a shift of a view area depending on user's head turn in some forms of the present disclosure.

For convenience when applying a large display, a head-/eye-turn direction may be set by a user. Referring to FIG. 17, the larger the head turn β is in a state where the user looks at a conventional O/S mirror (the left), the smaller the reflection angle α is. On the other hand, a vehicle image controller 100 of FIG. 1 may allow the user to perform settings in a reverse direction to assign a degree of freedom to the user, such that, the larger the head turn the larger the reflection angle α.

Figure 18:
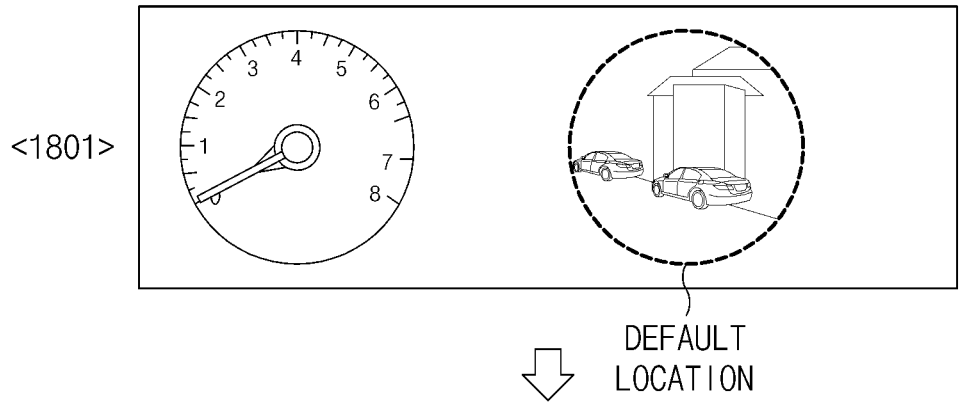
FIG. 18 is a drawing illustrating an example of shifting an area displayed on a display depending on a shift of a view area when a turn signal is operated in one form of the present disclosure.
Figure 18:
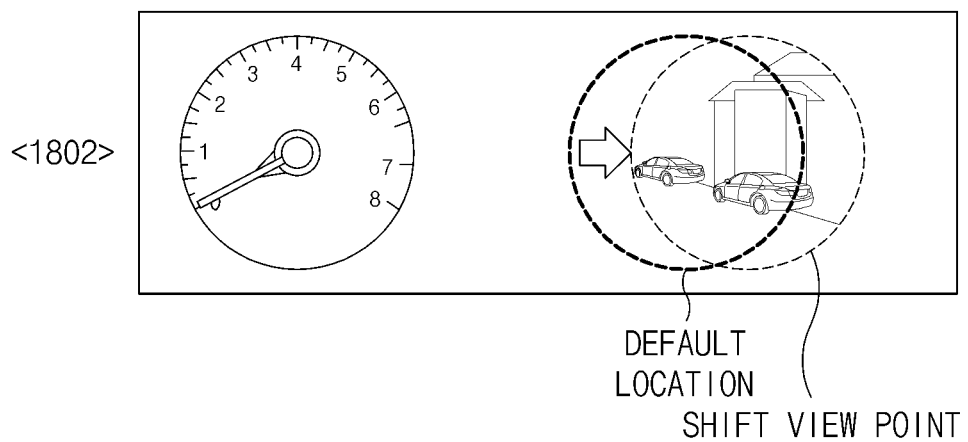

FIG. 18 is a drawing illustrating an example of shifting an area displayed on a display depending on a shift of a view area when a turn signal is operated in some forms of the present disclosure.

Referring to FIG. 18, as there is a tendency that a display 500 of FIG. 1 becomes large, a vehicle image controller 100 may be implemented, such that a view area is shifted in a reference location on the display 500 in reference numeral 1802 when an area shown to a user in reference numeral 1801 moves according to motion of the user if necessary, to be implemented more intuitively.

Figure 19:
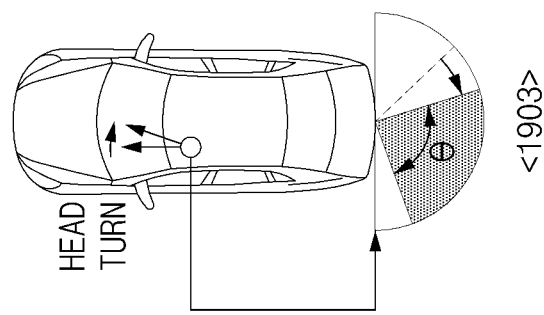
FIG. 19 is a drawing illustrating a display in one form of the present disclosure.
Figure 19:
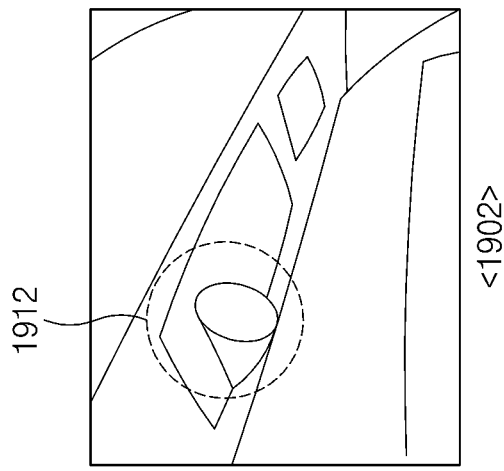
Figure 19:
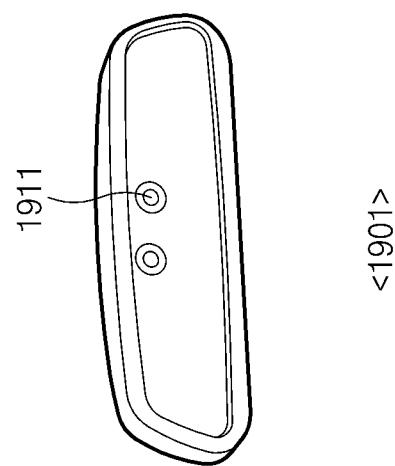

FIG. 19 is a drawing illustrating a display in some forms of the present disclosure.

Referring to FIG. 19, in reference numeral 1901, a vehicle image controller 100 of FIG. 1 may apply a camera 1911 mounted on an inside mirror for looking at passengers in a vehicle to recognize motion of a user using the camera 1911 when the user turns his or her head and may mount a display instead of a mirror to stably ensure real sight without interfering with a view of the user due to the C pillar, heads or seats of passengers, the package tray, or the like.

When it is difficult to ensure a rear view due to a vehicle style such as a truck, the mounted display may display an image using a rear-view camera 1912 instead of a mirror. Reference numeral 1093 indicates a shift of a view area according to user's head turn.

Figure 20:
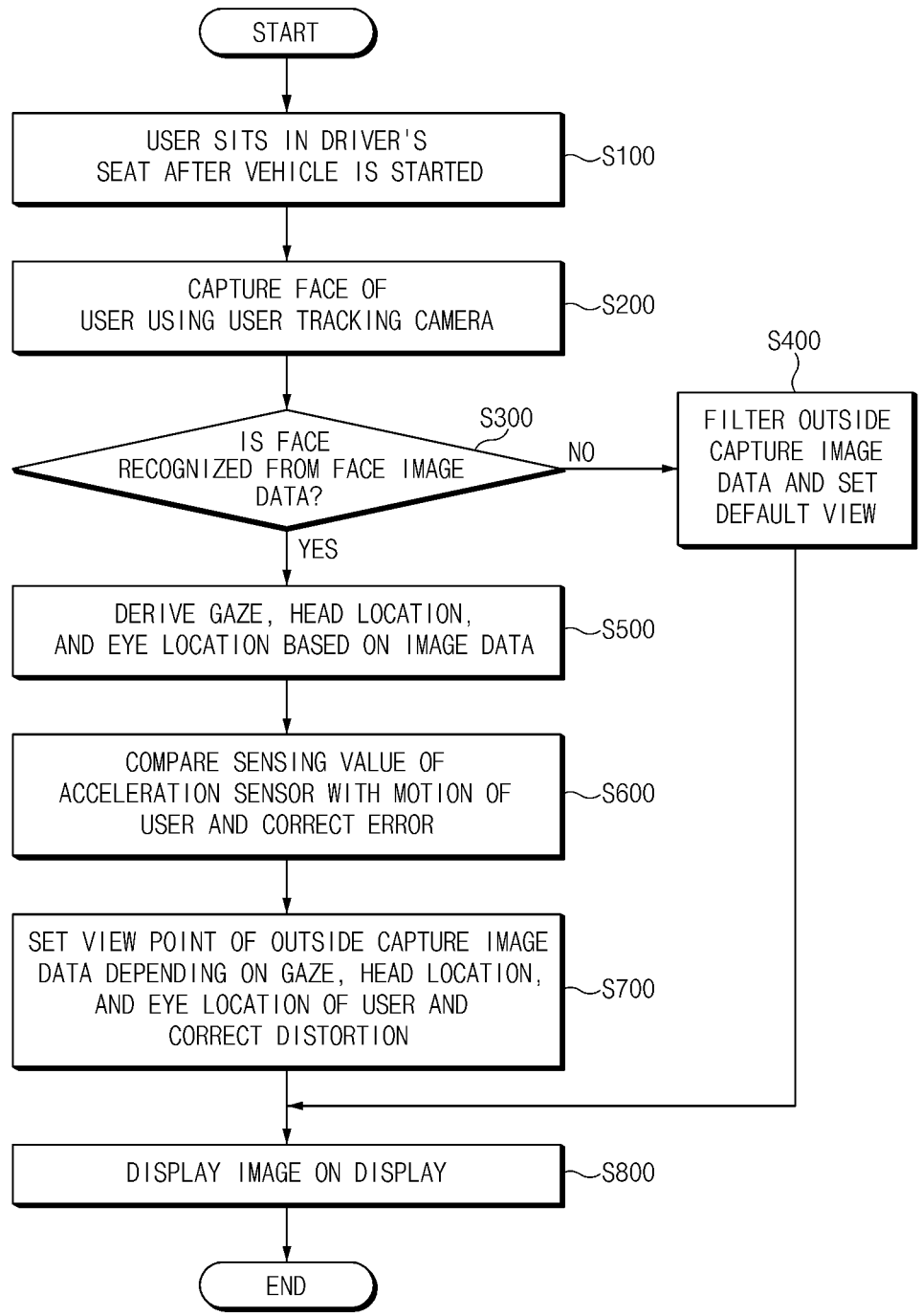
FIG. 20 is a flowchart illustrating a vehicle image control method in one form of the present disclosure.

Hereinafter, a description will be given in detail of a vehicle image control method in some forms of the present disclosure with reference to FIG. 20. FIG. 20 is a flowchart illustrating a vehicle image control method in some forms of the present disclosure.

Hereinafter, it is assumed that a vehicle image controller 100 of FIG. 1 performs a process of FIG. 20. Furthermore, in a description of FIG. 20, an operation described as being performed by an apparatus may be understood as being controlled by a processor 130 of the vehicle image controller 100.

Referring to FIG. 20, when a user sits in the driver's seat after a vehicle is started in S100, in S200, a face of the user may be captured by a user tracking camera 200 of FIG. 1. In this case, when the user sits in the driver's seat, the apparatus may provide voice guidance for setting a reference point for face recognition.

In S300, the apparatus may determine whether it is able to perform face recognition from face image data. When it is difficult to perform the face recognition, in S400, the apparatus may filter outside capture image data and may set a default view. In S800, the apparatus may display an image on a display 500 of FIG. 1. In this case, when it is able to perform the face recognition, in S500, the apparatus may derive a gaze (a gaze direction), a head location, and eye location of a user from image data.

In S600, the apparatus may compare a sensing value (acceleration) of an acceleration sensor of the vehicle with motion of the user and may correct an error of the image as a result of the comparison. In other words, as shown in FIGS. 10 and 11, the apparatus may perform exception processing when a behavior of the user is incorrectly recognized as the motion of the user.

Furthermore, in S700, the apparatus may set a view point of outside capture image data depending on one or more of the gaze, the head location, and/or the eye location of the user and may correct distortion due to an increase in angle of view.

In S800, the apparatus may display the corrected image on the display 500.

As such, with the development of camera technology, an area of indirect sight has been gradually replaced with a camera (a BVM, an RVM, an SVM, or the like). Because an angle of view provided by the camera is greater than a view area the user directly sees through a mirror, convenience may be provided to the user. However, on the other hand, because the camera has a fixed view area, a degree of freedom in which it is able for the user to expand his or her view to another portion through his or her head turn and check an area around him or her is degraded. Because a rear view camera which operates upon parking does not display a corner part of a rear bumper on its screen, it is unsafe to park without a conventional outside/inside mirror.

Thus, some forms of the present disclosure may ensure a sight area using a principle and function of a user tracking camera (motion/face/eye tracking) and a wide-angle camera having a larger angle of view and may change a view area depending on motion (head-/eye-turn or the like) of the user to expand a recognizable area and assign a degree of freedom to the user. As a result, the user may freely shift a view area concurrently with ensuring a view area larger than an existing mirror. A camera does not need to be additionally installed to obtain a desired view.

Furthermore, to address problems in which a distortion of the image is increased when an angle of view of the camera becomes large and in which it is difficult for the user to recognize an object at a side because the object is displayed to be small in size on a small display, some forms of the present disclosure may perform distortion correction for an area displayed on the display and may display an image rather than simply increasing a size of a display, thus preventing costs from rising because of using a large display.

Figure 21:
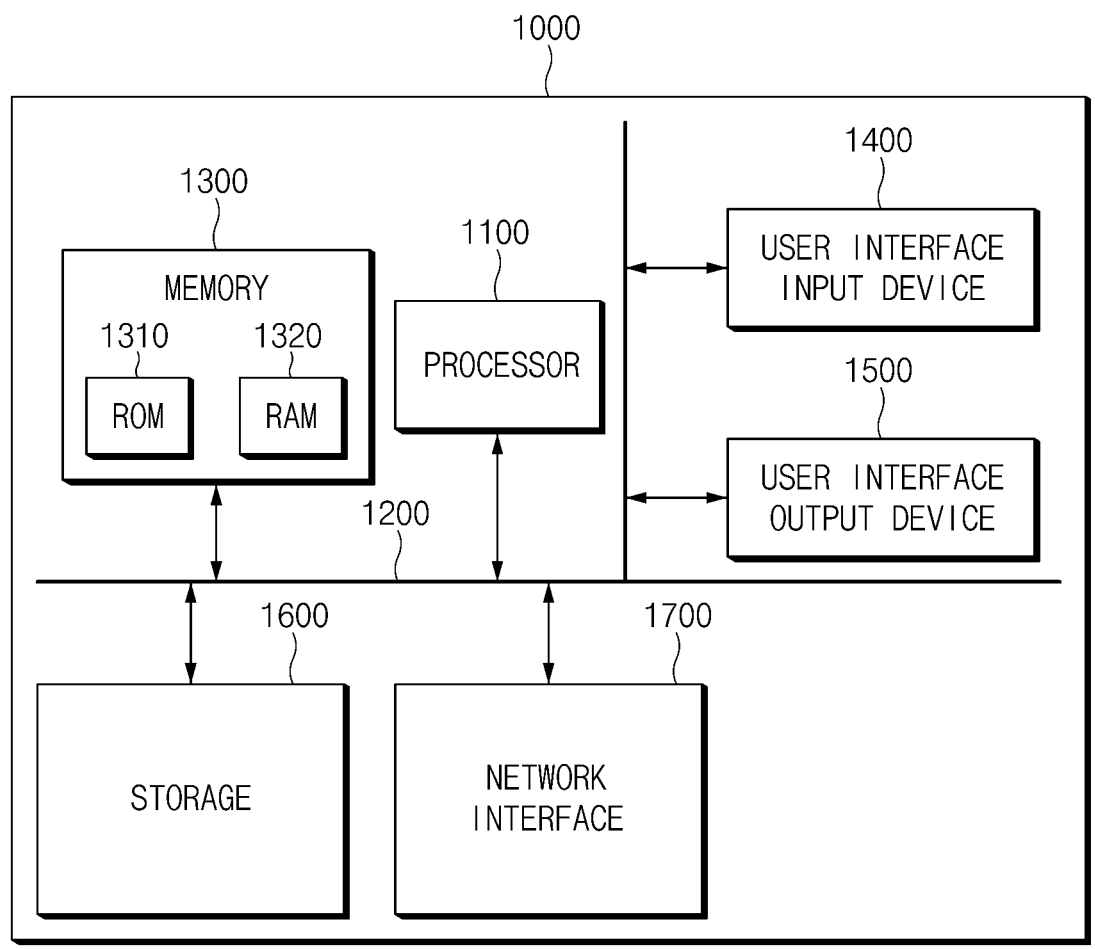
FIG. 21 is a block diagram illustrating a computing system in one form of the present disclosure.

FIG. 21 is a block diagram illustrating a computing system in some forms of the present disclosure.

Referring to FIG. 21, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in some forms of the present disclosure may be embodied directly in hardware or a software module executed by the processor 1100, or in a combination thereof.

The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present technology may increase an angle of view of a camera depending on head or gaze motion of the user and may shift and display a view point, thus increasing a degree of view freedom of the user.

Furthermore, the present technology may correct distortion according to an increase in angle of view of the camera and may provide an image, the distortion of which is corrected, thus increasing convenience of the user and increasing merchantability of the system.

In addition, various effects directly or indirectly ascertained through the present disclosure may be provided.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle image controller, comprising:
   a processor configured to:
      determine a head motion of a driver or a sight motion of the driver; and
      align a view point displayed on a display of a vehicle corresponding to the head motion or the sight motion; and
   a storage configured to store information regarding the head motion or the sight motion,
   wherein the processor is configured to:
      set a reference location on image data displayed on the display based on at least one of a sight of the driver, a head location of the driver, or an eye location of the driver; and
      shift and display the view point based on the reference location.

2. The vehicle image controller of claim 1, wherein the processor is configured to:
   extract at least one of the sight of the driver, the head location of the driver, or the eye location of the driver based on face image data of the driver.

3. The vehicle image controller of claim 2, wherein the processor is configured to:
   extract and filter at least a portion of vehicle image data that the driver sees outside the vehicle based on at least one of the sight of the driver, the head location of the driver, or the eye location of the driver.

4. The vehicle image controller of claim 2, wherein the processor is configured to:
   correct an error of a filtered vehicle image data based on an acceleration sensing value of the vehicle.

5. The vehicle image controller of claim 4, wherein the processor is configured to:
   correct the error by removing a noise using acceleration of each axis from the acceleration sensing value of the vehicle, wherein the noise is caused by a vehicle movement and a vehicle impact in the head motion or the sight motion.

6. The vehicle image controller of claim 3, wherein the processor is configured to:
   correct a distortion of wide-angle image data, wherein the wide-angle image data is the vehicle image data.

7. The vehicle image controller of claim 6, wherein the processor is configured to:
   correct the distortion of the wide-angle image data by applying a correction filter to an area displayed on the display in the wide-angle image data.

8. The vehicle image controller of claim 6, wherein the processor is configured to:
   invert an area displayed on the display in the wide-angle image data based on the head motion or the sight motion;
   shift a view point of the area displayed on the display; and
   expand and display a view area.

9. The vehicle image controller of claim 1, wherein the processor is configured to:
   set eyes and a center point of the eyes based on face image data when the driver sits in a driver seat.

10. The vehicle image controller of claim 9, wherein the processor is configured to:
    set reference axes of X-axis and Y-axis on the face image data; and
    determine an amount of view point movement of the driver based on an amount of offset between the reference axes and the center point.

11. The vehicle image controller of claim 10, wherein the processor is configured to:
    determine the amount of view point movement of the driver based on the amount of offset between the reference axes and the center point or a distance between the eyes when the driver turns a head of the driver toward Z-axis.

12. A vehicle system, comprising:
    a display configured to display an image outside a vehicle; and
    a vehicle image controller configured to:
       determine a head motion of a driver or a sight motion of the driver; and
       align a view point displayed on the display corresponding to the head motion or the sight motion,
    wherein the vehicle image controller is configured to:
       set a reference location on image data displayed on the display based on at least one of a sight of the driver, a head location of the driver, or an eye location of the driver; and
       shift and display the view point based on the reference location.

13. The vehicle system of claim 12, wherein the system further comprises:
    a driver tracking camera configured to capture a face or eyes of the driver; and
    a plurality of vehicle cameras configured to:
       capture a front side of the vehicle, a rear side of the vehicle, a left side of the vehicle, and a right side of the vehicle; and
       provide a wide-angle image.

14. The vehicle system of claim 13, wherein the plurality of vehicle cameras includes at least one of a blind-spot monitoring (BVM), a rear view monitoring (RVM), or a rear view camera.

15. The vehicle system of claim 13, wherein the driver tracking camera is mounted on at least one of a lower end of a cluster, a crash pad, a steering wheel shroud, an audio, video, navigation (AVN), a headlining, or an overhead console of the vehicle.

16. The vehicle system of claim 13, wherein the system further comprises:
an acceleration sensor configured to sense X-, Y-, or Z-axis acceleration of the vehicle.

17. A vehicle image control method, comprising:
determining a head motion of a driver or a sight motion of the driver; and
controlling a view point displayed on a display of a vehicle such that the view point is aligned and displayed corresponding to the head motion or the sight motion;
wherein controlling the view point comprises:
setting a reference location on image data displayed on the display based on at least one of a sight of the driver, a head location of the driver, or an eye location of the driver; and
shifting and displaying the view point based on the reference location.

18. The vehicle image control method of claim 17, wherein determining the head motion or the sight motion comprises:
extracting at least one of the sight of the driver, the head location of the driver, or the eye location of the driver from face image data of the driver;
setting reference axes of X-axis and Y-axis on the face image data; and
determining an amount of view point movement of the driver based on an amount of offset between the reference axes and a center point of eyes.

19. The vehicle image control method of claim 17, wherein controlling the view point comprises:
extracting and filtering at least a portion of vehicle image data that the driver sees outside the vehicle based on at least one of a sight of the driver, a head location of the driver, or an eye location of the driver;
correcting an error of a filtered vehicle image data based on an acceleration sensing value of the vehicle; and
correcting the error by removing a noise using acceleration of each axis from the acceleration sensing value of the vehicle, wherein the noise is caused by a vehicle movement and a vehicle impact in the head motion or the sight motion.

* * * * *